United States Patent Office 3,445,274
Patented May 20, 1969

3,445,274
FLUOROACID DERIVATIVES OF TRISAZINDINYL PHOSPHINE OXIDES AND SULFIDES AND METHOD OF COATING SURFACE HAVING ACTIVE HYDROGEN THEREWITH
Domenick Donald Gagliardi, East Greenwich, R.I., assignor to Colgate-Palmolive Company, New York, N.Y., a corporation of Delaware
No Drawing. Continuation-in-part of application Ser. No. 288,490, June 17, 1963. This application Nov. 2, 1966, Ser. No. 591,411
Int. Cl. D06m *13/48*
U.S. Cl. 117—121    11 Claims This application is a continuation-in-part of my application Ser. No. 288,490 filed June 17, 1963, now abandoned.

The present invention relates to the preparation of novel fluoroacid derivatives of the tris-aziridinyl phosphine oxides and sulfides and more particularly to the preparation of fluoroacid derivatives having four to twenty-two carbon atoms and having seventy-five to ninety percent of the hydrogen atoms attached to carbon atoms replaced by fluorine atoms. The present invention also relates to the treatment of surfaces of textiles, of wood, of metal, of ceramics, with the aforesaid novel fluoroacid derivatives of tris-aziridinyl phosphine oxides and sulfides.

As is well known, one of the simplest heterocyclic compounds is the hypothetical azirine or azacyclopropane. However, aziridine or ethylenimine having the structure recognized by Markweld in 1900 as H was first obtained by Gabriel in 1888.

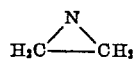

As emphasized in U.S. Patent No. 3,034,919, one of the most effective of the prior art treatments of cellulosic fibers to impart flame retarding properties thereto is that of impregnating the fibers or fabrics with solution of an aziridinyl phosphine oxide. However, it is also emphasized that one of the disadvantages of impregnating the cellulosic fibers with aziridinyl phosphine oxide and polymerizing the aziridinyl phosphine oxide by heating is that the polymerization step is sometimes dangerously violent. The patentees of U.S. Patent No. 3,034,919 propose to overcome the aforesaid disadvantage by dissolving the reaction product containing the aziridinyl phosphine oxide in an excess of a concentrated ammonium hydroxide from the viscous liquid product.

The application of tris-aziridinyl phosphine oxide to fabrics not only flame proofs the fabric but also makes the fabric resistant to creasing and shrinkage. On the other hand, a fabric treated with tris-aziridinyl phosphine oxide is not water repellent and is not oil repellent as determined, for example, by AATCC Standard Test Method 22–1952 for resistance to wetting and the 3M Oil Repellency Test described in "3M Textile Chemicals," Appendix A, Test Methods, page 1.

It has now been discovered that the disadvantage of a dangerously violent polymerization step and the lack of water-and-oil repellency can be overcome by employing as impregnating material mono- or di-fluoroacid derivatives of tris-aziridinyl phosphine oxides or sulfides and analogues thereof. Furthermore, non-reactive surfaces such as metal surfaces can be made water-and-oil repellent by coating with tri-fluoro-derivatives of tris-aziridinyl phosphine oxides or sulfides and analogues thereof.

Fiber reactive fluoroacid derivatives of tris-aziridinyl phosphine oxides and sulfides and analogues thereof have compositions corresponding to the following formulae:

Mono-fluoro derivative

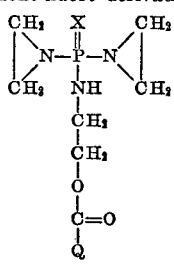

where X is oxygen or sulfur and Q is an alkyl group having three to twenty-two carbon atoms and $2n+2$ hydrogen atoms, wherein $n$ equals the number of carbon atoms, of which 70 to 100 percent have been replaced by fluorine atoms and preferably the terminal group is $-CF_3$.

Tri-fluoro derivative

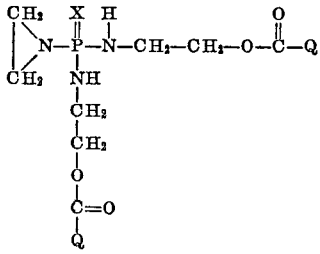

where X and Q have the same significance as hereinbefore.

Tri-fluoro derivative

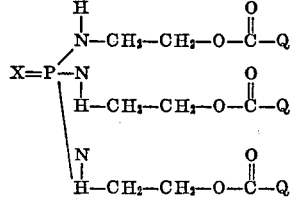

where X and Q have the same significance as hereinbefore.

It is to be noted that the mono- and di-fluoro derivatives are reactive with substrates having active hydrogen, e.g., cellulose, natural or regenerated, wool, and proteinaceous natural and synthetic materials.

The tri-fluoro derivatives are not reactive but can be used to film or coat surfaces not having reactive hydrogen, for example, metals, ceramics including glass, elastomers, and resins.

The novel fluoroacid derivatives of tris-aziridinyl phosphine oxide and sulfide and analogues thereof are prepared by reacting the phosphine oxide or sulfide with fluoro acid at temperatures in the range of about 65° F. and 212° F. for about one hour at room temperature and for shorter periods at the higher temperatures depending on solvents employed.

The reactions can be represented by the equations:

(1)
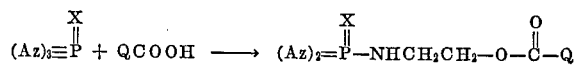

(2)
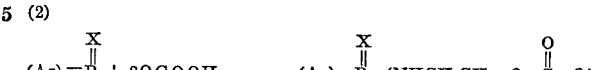

(3)
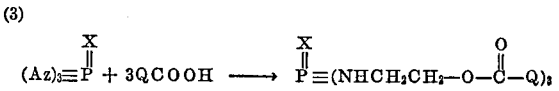

where (Az) is

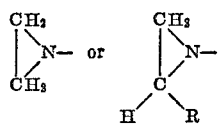

and R is CH₃.

Examples of suitable fluoracids (QCOOH) for reaction with the tris-aziridine compounds include perfluorobutanoic acid (F(CF$_2$)$_3$COOH)
perfluoropentanoic acid (F(CF$_2$)$_4$COOH)
perfluorohexanoic acid (F(CF$_2$)$_5$COOH)
perfluoroheptanoic acid [F(CF$_2$)$_6$COOH]
perfluoro-octanoic acid [F(CF$_2$)$_7$COOH]
perfluorodecanoic acid [F(CF$_2$)$_9$COOH]
hexadecafluorononanoic acid (H(CF$_2$)$_8$COOH)
dodecafluoroheptanoic acid (H(CF$_2$)$_6$COOH)
Ecosafluoroundecanoic acid (H(CF$_2$)$_{10}$COOH)
decafluorohexanoic acid (H(CF$_2$)$_5$COOH)
3H, perfluoro-octanoic acid

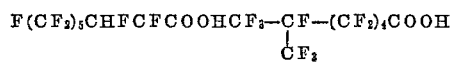

3,5,6-tri-chlorooctafluorohexanoic acid
  Cl(CF$_2$CFCl)$_2$CF$_2$COOH
3,5,7,8-tri-chlorooctafluorohexanoic acid
  Cl(CF$_2$CFCl)$_3$CF$_2$COOH
etc.

The following examples will serve to illustrate the present invention without being deemed limitative thereof. Parts are by weight unless otherwise indicated.

EXAMPLE I 3.0 grams of perfluorooctanoic acid, i.e., pentadecafluorooctanoic acid were reacted with 7.5 grams of tris-aziridinyl phosphine oxide at pH 5.4 in 89.5 grams of water at room temperature for one hour. Since the molecular weight of pentadecafluorooctanoic acid, i.e., perfluorooctanoic acid is 414 and the molecular weight of tris-aziridinyl phosphine oxide is 173, the mol ratio of tris-aziridinyl phosphine oxide to perfluorooctanoic acid is 6 to 1 [(7.5×414)/(173×3)=6].

The product of the foregoing reaction hereinafter designated Product A was applied to cotton, a material having reactive hydrogen, in the following manner: a piece of 80 x 80 cotton weighing 13.5 grams was placed in a pint jar in a Launder-Ometer. Twenty-five steel balls were placed in the jar and the jar charged with a solution of the reaction product of the aforedescribed reaction. Initially the temperature of the solution was in the range of 80° to 85° F. The temperature of the solution was raised to 120° F. for three minutes. The cotton was removed from the solution and dried. The so-treated cotton was then subjected to tests described hereinafter to determine the degree of water repellency and the degree of oil repellency as reported hereinafter.

Water repellency.—Resistance to wetting (spray test), AATCC Standard Test Method 22–1952

This test method is applicable to any textile fabric. It measures the resistance of fabrics to wetting by a water spray and the results depend primarily on the degree of hydrophobicity inherent in the fibers and yarns and subsequent treatments. Water is sprayed against the taut surface of a test specimen. Evaluation of the wetted pattern is readily brought about by comparing the wetted pattern with standard wetting-pattern pictures. The specimen is rated on the following scale:

100—No sticking or wetting of the upper surface.
90—Slight random sticking or wetting of the upper surface.
80—Wetting of the upper surface at the spray points.
70—Partial wetting of the whole of the upper surface.
50—Complete wetting of the whole of the upper surface.
0—Complete wetting of the whole of the upper and the lower surfaces.

The test specimens of minimum size of 7 inches by 7 inches (7 x 7) are conditioned at 70° F. and 65 percent relative humidity for a minimum of four hours before testing.

The test specimen, fastened securely and wrinkle-free in a metal hoop having a diameter of 6 inches, is placed and centered 6 inches under a standard spray nozzle at an angle of 45 degrees to the horizontal. Two hundred and fifty milliliters of water at 80 ±2° F. is poured into a funnel attached above the spray nozzle. The spray lasts for twenty-five to thirty seconds at the end of which time the hoop is taken by one edge and the opposite edge tapped smartly once against a solid object with the wet side facing the solid; this procedure is repeated with the hoop reversed 180 degrees.

Oil repellency.—3M Oil Repellency Test, 3M Textile Chemicals, Appendix A Test Methods, page 1

The Minnesota Mining and Manufacturing Company oil repellency test is based on the different penetrating properties of the two hydrocarbon liquids, mineral oil (Nujol) and n-heptane. The Nujol-heptane proportions for each rating were selected by 3M so as to give oily stain resistance somewhat comparable to the water-borne stain resistance corresponding to each of the spray ratings of the AATCC Standard Test Method 22–1952.

| Oil Repellency Rating | Percent Heptane (by volume) | Percent Nujol (by volume) |
|---|---|---|
| 100+ | 60 | 40 |
| 100 | 50 | 50 |
| 90 | 40 | 60 |
| 80 | 30 | 70 |
| 70 | 20 | 80 |
| 50 | 0 | 100 |
| 0 | --- | (¹) |

¹ No hold out to Nujole.

The standard oil-heptane, i.e., Nujol-heptane, mixtures are contained in small stoppered medicine-dropper bottles. A drop of each is placed on the fabric. The appearance of the test oil is observed through the drop. Note whether wetting or penetration occurs. The number corresponding to that mixture containing the highest percentage of heptane which does not penetrate or wet the fabric after three minutes is considered the oil repellency of the system.

The change in the optical refractivity of the drop is often an indication of wetting. In some cases wetting can be better determined by observing the other side of the fabric. In some cases of "0" oil/heptane rating, the term "0+" has been used to indicate a modicum of resistance to wetting by oil.

EXAMPLE II

Example I is repeated using the products indicated in Table I.

TABLE I

| Treating material | Mole ratio, IP/PDFA | Treatment temperature | Repellency Spray | Oil |
|---|---|---|---|---|
| A | ¹ 6:1 | RT | 80 | 100+ |
| B | 6:1 | RT | 80 | 100+ |
| C | ¹ 4.8:1 | RT | 0 | 90 |
| D | ³ 4.5:1 | RT | 0 | 50 |
| E | ¹ 1.2:1 | RT | 0 | 0 |
| F | ¹ 2.4:1 | RT | 0 | 50 |
| G | ¹ 7.2:1 | RT | 50/0 | 50 |

PDFA is pentadecafluorooctanoic acid.
¹ Tris-aziridinyl phosphine oxide.
² Tris-2 methylaziridinyl phosphine oxide.
³ Tris-2 methylaziridinyl phosphine sulfide.

A factor in evaluating materials for enhancing or endowing surfaces with water and/or oil repellency which is of considerable importance in the treating of textiles is the appearance of the textile before and after washing.

A measure of this characteristic of the coated textile is the reflectance of the treated surface. The reflectance of the surface is determined as follows:

The data tabulated in Table II establishes that cotton treated with a fluoroalkanoic acid such as PDFA derivatives and soiled with dry soil has a higher reflectance before washing, i.e., does not look as dirty as untreated cotton and has a reflectance after washing at least as good if not better than untreated cotton after washing.

TABLE II

| Treating agent | Mol ratio, IP/PDFA | Treatment of substrate, Method 1 | | Treatment of substrate, Method 2 | |
| --- | --- | --- | --- | --- | --- |
| | | B | A | B | A |
| None | | | | 32 | 61 |
| E | 1.2:1 | 54 | 77 | 50 | 75 |
| F | 2.4:1 | 50 | 74 | 50 | 73 |
| G | 7.2:1 | 46 | 69 | 46 | 69 |

Method 1—Heat-treated substrate at 300° F. for five minutes.
Method 2—Treat substrate at room temprature, e.g., 70° F.

It will be observed that untreated cotton before washing has a reflectance value of 32. On the other hand, whether the fluoroalkanoic acid derivative is applied at room temperature or heat treated at elevated temperatures the treated cotton has a reflectance of 46 to 54. In other words, the treated surface reflects more of the light before washing than the untreated cotton. After washing the treated cotton has at least as high a reflectance as the untreated cotton. In fact, the treated cotton reflects about 10 to about 25 percent more light after washing than the untreated cotton.

The products of Examples 1 and 2 are essentially mono compounds. In the following examples the indicated compounds are used.

(A) 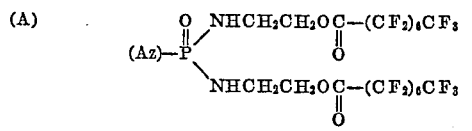

(B) 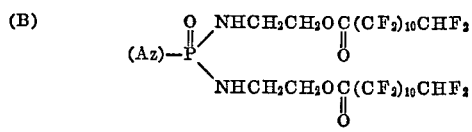

(C) 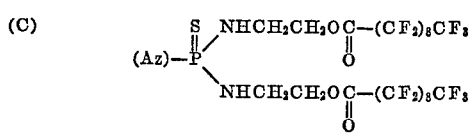

The data presented hereinbefore is exemplary of the treatment of surfaces to enhance the oil and/or water repellency thereof or to endow the surface with oil and/or water repellency by treatment of the surface with at least one fluoroalkanoic acid derivative of tris-aziridinyl phosphine oxide or sulfide or the methyl substituted analogue of the phosphine oxide or sulfide. Accordingly, the present invention provides for treating surfaces having reactive hydrogen preferably with at least one fluoroalkanoic acid derivative having a composition represented by the formula,

where X is oxygen or sulfur, R is hydrogen or $CH_3$, N is nitrogen, P is phosphorus, Q is the alkyl group straight or branched chained having 3 to 21 carbon atoms having 70 to 100 percent of the $n+2$ hydrogen atoms, wherein $n$ equals the number of carbon atoms replaced with fluorine atoms and having a terminal —$CF_3$ group or $CHF_2$ group, and $m$ is one or two.

Surfaces not having active hydrogen and less preferably surfaces having active hydrogen are treated with at least one fluoroalkanoic acid derivative having a composition represented by the formula:

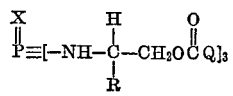

where X, R, N, P and Q have the significance given hereinbefore.

The fluoroalkanoic derivatives can be applied in situ at temperatures from room temperature, i.e., 65° to 75° F. up to 212° F. That is to say the textile or other material to be treated is immersed in an aqueous solution of the aziridinyl phosphine oxide or sulfide and the fluoroalkanoic acid added to the solution. The phosphine oxide or sulfide reacts with the hydrogen of the surface through the aziridinyl group and the fluoroalkanoic acid reacts with the aziridinyl group thus forming the treating agent in situ on the surface of the substrate. Alternatively, the fluoroalkanoic acid derivative of the phosphine oxide or sulfide is prepared to have at least one but not more than two aziridinyl groups and the reaction product in a suitable solvent such as methanol, dioxane, and acetone or in aqueous solution applied to the surface of the material to be treated at room temperature or the substrate heated to a temperature below its softening or charring temperature and preferably in the range of 250° to 350° F.

Thus, the fluoroalkanoic acid derivative of the aziridinyl phosphine oxide or sulfide in solution or as a dispersion can be applied to a textile and the textile ironed in the conventional household manner. Similarly, the surface of a wooden or metallic substrate can be coated with the fluoroalkanoic derivative of the aziridinyl phosphine oxide or sulfide and the coated substrate passed through an oven held at a temperature preferably in the range of 250° to 350° F. during a period of at least five minutes.

The following examples will further illustrate the present invention:

EXAMPLE III

A steel plate is immersed in a 5% solution in dioxane of

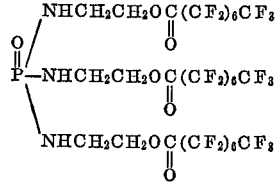

and then dried. Excellent oil and water repellency is obtained.

EXAMPLE IV

Example III is repeated using the following compounds:

(D) 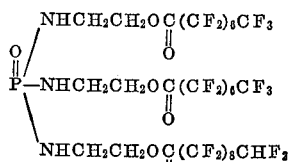

(E) 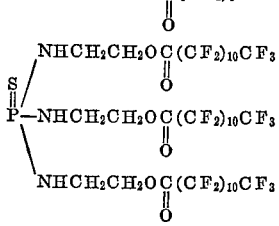

(F) 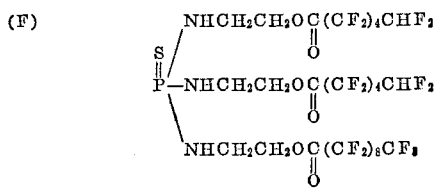

(G) 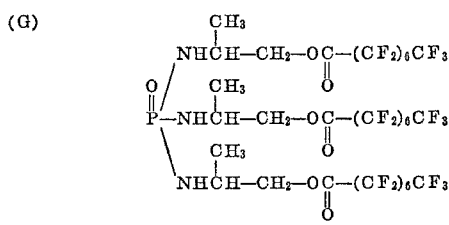

(H) 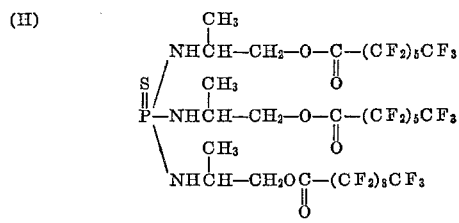

The results are similar to those in Example III.

EXAMPLE V

The procedure of Example I is repeated except that the compounds used to treat the cotton are as follows:

(A) 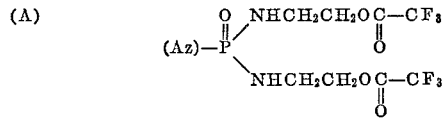

(B) 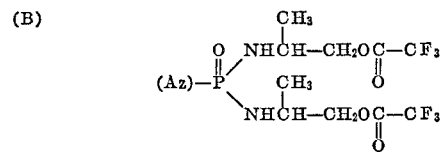

(C) 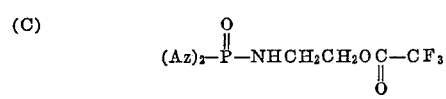

(D) 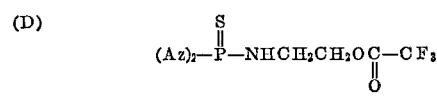

(E) 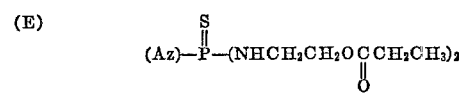

The treated cotton in each case is neither water-repellent or oil-repellent.

I claim:
1. As a new composition of matter fluoroalkanoic acid derivatives of aziridinyl phosphine oxide and sulfide having a composition corresponding to the formula,

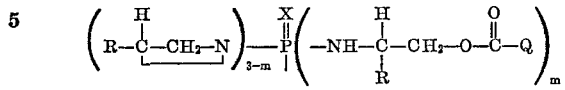

where R is selected from the group consisting of hydrogen and CH$_3$, N is nitrogen, P is phosphorus, X is selected from the group consisting of oxygen and sulfur, $m$ is 1, 2 or 3, Q is the alkyl group of an alkanoic acid having 4 to 22 carbon atoms having a terminal group selected from CF$_3$ and CHF$_2$ groups and having about 70 to about 100 percent of the hydrogens other than the carboxyl hydrogen replaced with fluorine atoms.

2. The fluoroalkanoic acid derivatives set forth in claim 1 wherein the fluoroalkanoic acid is pentadecafluorooctanoic acid and wherein the aziridinyl moiety of the derivative is derived from tris-aziridinyl phosphine oxide.

3. A body having active hydrogen at the surface and a coating of fluoroalkanoic acid derivative having a composition as defined in claim 1.

4. A body as defined in claim 3 wherein the said alkanoic acid is pentadecafluorooctanoic acid.

5. A body having a coating of fluoroalkanoic acid derivative having a composition as defined in claim 1.

6. A body having a coating of fluoroalkanoic acid derivative as set forth in claim 5 wherein the fluoroalkanoic acid is pentadecafluorooctanoic acid.

7. A method of coating a substrate which comprises immersing said substrate in a solution of a tris-aziridinyl derivative selected from the group consisting of phosphine oxide and phosphine sulfides, adding fluoroalkanoic acid having 4-22 carbon atoms, a terminal fluoromethyl group and 70 to 100 percent of the hydrogen atoms other than carboxyl-hydrogen replaced with fluorine atoms, holding the mixture at a temperature in the range of 65° to 100° for time inversely as the temperature and about one hour at 75° F. and obtaining a substrate having a coating of fluoroalkanoic acid derivative.

8. A method of coating a substrate having active hydrogen in the surface which comprises treating said substrate with a composition as defined in claim 1 wherein $m$ is 1 or 2 and holding said treated substrate at a temperature below the melting or charring point thereof for at least about one minute.

9. The method set forth in claim 8 wherein the treated substrate is held at a temperature in the range of 250° to 350° F.

10. The method set forth in claim 8 wherein the fluoroalkanoic acid is pentadecafluorooctanoic acid.

11. The method set forth in claim 8 wherein X is oxygen and the alkanoic acid is pentadecafluorooctanoic acid.

References Cited

UNITED STATES PATENTS 2,567,011  9/1951  Diesslin et al. ____ 260—430 X
2,915,480  12/1959  Reeves et al. ____ 260—239 X WILLIAM D. MARTIN, *Primary Examiner.*

THEODORE G. DAVIS, *Assistant Examiner.*

U.S. Cl. X.R.

8—116; 117—62.2, 118, 124, 127, 135.5, 136, 138.8, 139.5, 141, 144, 147; 260—2, 239